United States Patent
Fukui

(10) Patent No.: US 9,163,959 B2
(45) Date of Patent: Oct. 20, 2015

(54) POSITION DETECTING DEVICE USING REFLECTION TYPE PHOTOSENSOR

(71) Applicant: NEW JAPAN RADIO CO., LTD., Tokyo (JP)

(72) Inventor: Kazuhito Fukui, Fujimino (JP)

(73) Assignee: NEW JAPAN RADIO CO., LTD., Tokyo (JP)

( * ) Notice: Subject to any disclaimer, the term of this patent is extended or adjusted under 35 U.S.C. 154(b) by 108 days.

(21) Appl. No.: 14/174,287

(22) Filed: Feb. 6, 2014

(65) Prior Publication Data

US 2014/0263986 A1    Sep. 18, 2014

(30) Foreign Application Priority Data

Mar. 12, 2013    (JP) .................................. 2013-049066

(51) Int. Cl.
*G01D 5/34*     (2006.01)
*G01D 5/347*    (2006.01)

(52) U.S. Cl.
CPC .................. *G01D 5/34715* (2013.01)

(58) Field of Classification Search
CPC .......................... G01D 5/34746; G01D 5/3473
See application file for complete search history.

(56) References Cited

U.S. PATENT DOCUMENTS

| | | | |
|---|---|---|---|
| 8,013,596 B2 | 9/2011 | Hoshino | |
| 8,309,906 B2 * | 11/2012 | Kapner et al. | 250/231.16 |
| 8,488,131 B2 * | 7/2013 | Horiguchi | 356/616 |
| 8,604,413 B2 * | 12/2013 | Tobiason | 250/237 G |
| 8,941,051 B2 * | 1/2015 | Ohno et al. | 250/231.13 |
| 2013/0015336 A1 | 1/2013 | Ohno et al. | |

FOREIGN PATENT DOCUMENTS

| | | |
|---|---|---|
| JP | 04009712 | 1/1992 |
| JP | 05045179 | 2/1993 |
| JP | 2002357762 | 12/2002 |
| JP | 2006173306 | 6/2006 |
| JP | 2006292396 | 10/2006 |
| JP | 2009038321 | 2/2009 |
| JP | 2013036972 | 2/2013 |

* cited by examiner

*Primary Examiner* — Tony Ko
(74) *Attorney, Agent, or Firm* — Perman & Green, LLP

(57) ABSTRACT

A position detecting device using a reflection type photosensor, comprising a reflector fitted to a moving target and having reflecting portions and non-reflecting portions arranged alternately in a moving direction of the moving target, a reflection type photosensor having a light emitting element and a light receiving element with plural light receiving portions, and an operation unit for calculating a value indicating the position of the moving target. The light receiving element comprises the first and second light receiving portions outputting signals having different phases, the second light receiving portion is divided into two regions provided at far and near sides from the light emitting element about the first light receiving portion, and the operation unit calculates the value using the one signal calculated from the output signals from the two regions and the output signal from the first light receiving portion.

4 Claims, 5 Drawing Sheets

POSITION DETECTING DEVICE USING REFLECTION TYPE PHOTOSENSOR

CROSS-REFERENCE TO RELATED APPLICATIONS

This application claims priority to and the benefit of Japanese Patent Application No. 2013-049066 filed 12 Mar. 2013, the disclosure of which is incorporated by reference herein in its entirety.

BACKGROUND

1. Field

The presently disclosed embodiment relates to a position detecting device using a reflection type photosensor, and particularly to a device for detecting a position and a moving distance of a moving target in an apparatus such as a camera.

2. Brief Description of Related Developments

Various actuators have been used for driving a lens, for example, in a digital still camera, a camcorder, a monitoring camera and the like, and in order to conduct sensing of a position of such a movable lens, etc., a position detecting device is used.

For example, there are, as a device for detecting a position and a moving distance of a focus lens, a device of a type using a pulse generator like a stepping motor system and a device of a type using a photosensor or a magnetic sensor for analogically detecting a moving distance in a piezo motor system. Examples of the former type are described in JP 04-9712 A, and examples of the latter type are described in JP 05-45179 A, JP 2002-357762 A, JP 2006-173306 A, JP 2009-38321 A.

The above-mentioned stepping motor system undergoes rotation for each of rotation angles corresponding to the number of counted pulses generated, and this stepping motor system is usually used for applications requiring long distance position detection. However, since a motor is not rotated continuously, noise during the rotation is large, which leads to generation of an acoustic noise when taking a moving picture image, and moreover, there is a defect such as a delayed response.

For that reason, in a digital still camera, etc., piezo motor systems which are suitable for preventing generation of an acoustic noise when taking a moving picture image, increasing a speed of autofocus and down-sizing of an apparatus are used increasingly instead of the stepping motor system.

FIGS. 4A and 4B show a position detecting device with a reflection type photosensor which can be used for position detection using a piezo motor system. As shown in FIG. 4A, a reflection type photosensor 1 is configured such that a light emitting element 3 is disposed on one concave portion partitioned with a light-shielding wall 2 and a light receiving element 4 is disposed on another concave portion. Also, as shown in FIG. 4B, a reflector 5 is provided at the side of a light-emitting/light-receiving surface $S_L$ of the photosensor 1 so as to be in parallel with the light-emitting/light-receiving surface $S_L$ and move in a direction where the light emitting element 3 and the light receiving element 4 are arranged in a line. According to the configuration as mentioned above, light from the light emitting element 3 is reflected on the reflector 5 and is inputted into the light receiving element 4, and the position and the moving distance of the reflector 5 (a moving target to which the reflector is attached) are detected by the amount of received light.

In the position detection using such a reflection type photosensor, an example of a technique for improving performance of position detection and moving distance detection is described in JP 2006-173306 A, and an example of improvement in linearity of an output signal is described in JP 2009-38321 A.

Meanwhile, in a digital still camera of high-power or high-end models, a single lens reflex camera, a camcorder, a monitoring camera and the like, for lens position detection of a camera module in which zoom function and long distance detection are necessary, there is a case where long distance detection of not less than 10 mm with high resolution of not more than 5 µm is required, and actually such detection has been difficult in conventional position sensing using a reflection type photosensor.

On the other hand, magnetic sensors are used in position detection of a piezo motor type being designed to prevent an acoustic noise when taking a moving picture image, to achieve high speed autofocus and to down-size an apparatus using a position detecting device. An example of such a magnetic sensor is shown in JP 2006-292396 A. In this magnetic sensor of JP 2006-292396 A, a magnetic field generating member (magnet), in which S-poles and N-poles are arranged alternately, and two magnetic field detecting elements (MR element or hall element) are provided, and the position detection is carried out by amplifying outputs of the magnetic field detecting elements and conducting arithmetic processing thereof.

However, in the use of the above-mentioned magnetic sensor, there are the following problems.
1) A system itself becomes a large size.
2) A system cost becomes high since a magnetic field generating member, in which many S-poles and N-poles are arranged, is used.
3) It is difficult to improve linearity of a signal due to a configuration for detecting strength of a magnetic field.
4) In the case where another magnet is used in a device provided with a magnetic sensor or the like, there is a possibility of causing malfunction of the device due to an influence of interaction between the magnetic fields and the like.
5) Since outputs from the two magnetic field detecting elements are low, they need to be amplified using an operational amplifier, which leads to high cost of components constituting the system.
6) An error of a magnetic force in magnetizing of S-poles and N-poles of a magnetic field generating member easily occurs, an intensity of a magnetic field is hardly kept constant, and performance is deteriorated due to oxidation of a magnet.

In order to solve the problems mentioned above, the applicant of the instant application proposed a position detecting device using a reflection type photosensor (JP 2013-36972 A). The position detecting device using a reflection type photosensor proposed by the applicant of the instant application is shown in FIG. 5. The reflection type photosensor 1 is configured such that a light emitting element (LED) 3 is disposed on one concave portion 6a and a light receiving element (phototransistor) 4 is disposed on another concave portion 6b and the both portions are separated by an outer peripheral wall and a light-shielding wall 2. A reflector 5 is arranged at the side of a light-emitting/light-receiving surface of the reflection type photosensor 1 so as to move in a direction (a direction shown by an arrow) being parallel to the light-emitting/light-receiving surface and being approximately vertical to an arranging direction (longitudinal direction in the figure) of the light emitting element 3 and the light receiving element 4. This reflector 5 is mounted on a moving target such as a lens so as to move together with it. On the reflector 5, reflecting portions "sa" and non-reflecting portions "sb" in the form of extra fine stripes are formed and arranged alternately (in the form of vertical stripes).

As shown in FIG. 5, three light receiving portions 4a, 4b and 4c, into which respective receiving regions are divided to be different light receiving regions in the moving direction of the moving target, are formed on the light receiving element 4 of the reflection type photosensor 1. Regarding three output signals (referred to as A, B and C, respectively) from these three light receiving portions, sizes and arrangement of the reflection type photosensor 1, the light receiving element 4 and the reflector 5 are adjusted so that the signal (output B) phase-shifting forward at 90 degrees to the reference signal (output A) and the signal (output C) further phase-shifting forward at 90 degrees can be obtained.

These outputs from the light receiving portions are inputted to the buffer amplifiers 7a, 7b and 7c, respectively, and then are inputted to an operation means (MPU) 8 where a neutral potential of these outputs is calculated from the output A and the output C, between which there is a phase difference of 180 degrees, and calculation of linear values are carried out to obtain the values having linearity. In the operation means 8, a neutral potential D=(A+C)/2 is calculated from the output A and the output C, between which there is a phase difference of 180 degrees, and (A−B)/(A+B) (=b) and (A+B)/(A−B) (=a) are calculated from the output A and the output B, between which there is a phase difference of 90 degrees.

According to this calculation of linear values, as shown in FIG. 6, by the calculation of the neutral potential D, the neutral potential of the outputs A and B is always set at 0 V, and therefore, the calculation result shows repeated triangular waveforms having high linearity. In FIG. 6, the outputs A and B converted into the values within a range of from −1 to +1 are shown. The results of the calculations are those obtained using the converted values. In the triangular waveforms of FIG. 6, portions falling to the right are obtained by the above-mentioned equation (A+B)/(A−B) (=a), and portions rising to the right are obtained by the above-mentioned equation (A−B)/(A+B) (=b).

In another example of calculation of linear values, a moving distance can be detected by calculating arctan (A/B) to obtain a phase angle θ of the signal. FIGS. 7A and 7B show the configuration such that a moving distance of a movable target can be detected by determining arctan (A/B) by enabling one cycle of the output signal of the reflection type photosensor to be obtained when the movable target moves the sum of the width of the reflecting portion and the width of the non-reflecting portion of the reflector 5 comprising the reflecting portions "sa" and the non-reflecting portions "sb".

Meanwhile, in the position detecting device using a reflection type photosensor proposed by the applicant of the instant application, in order to obtain signals having a phase difference of 90 degrees for the calculation of arctan (A/B), the light receiving portions need to be arranged, as shown in FIG. 8, so that there are a portion where the light receiving portions 4a and 4b are overlapping and a portion where the light receiving portions 4b and 4c are overlapping when viewing from the light emitting element 3 side. FIG. 9 is a cross-sectional view of the overlapping portion cut in a longitudinal direction in FIG. 8. In the case where there are overlapping portions, as shown in FIG. 9, the travelling distance (shown by a full line with an arrow head) of light reaching the light receiving portion 4a or 4c after emitted from the light emitting element 3 and reflected on the reflector is not the same as the travelling distance (shown by a dotted line with an arrow head) of light reaching the light receiving portion 4b after emitted from the light emitting element 3 and reflected on the reflector. As a result, as shown in FIG. 10, there was a problem that the output voltages at the respective light receiving portions vary. There is the same problem when in FIG. 8, the light receiving portion 4b is located at the side of the light emitting element 3.

If the calculation of arctan is carried out using signals having varied output voltages, it leads to a problem that the pitch of the triangular waveforms shown in FIG. 7 is not the same and the detection of the position of the moving target cannot be carried out accurately.

Further, as shown in FIG. 10, detected positions indicating peak values of outputs of the light receiving element differ from each other, and curvatures of characteristic curves largely vary. As a result, in an actual application, there is a case where the following problem occurs.

In an application such as a camera lens module, the reflector 5 and the reflection type photosensor 1 are fixed to a movable part or a fixed part of an actuator casing. In this fixing, it is ideal if the reflector 5 and the reflection type photosensor 1 are located opposite to each other and the surfaces thereof are in parallel with each other. However, there is a case where the reflector 5 is fitted inclined with respect to the reflection type photosensor 1 due to poor accuracy in fabrication of the casing, fitting of the movable part, fitting of the reflector or fitting of the reflection type photosensor or from the viewpoint of application.

For example, FIG. 11 shows a configuration where the reflector 5 is fitted inclined with respect to the reflection type photosensor 1. When the reflector 5 fitted so as to be inclined moves, there arises a problem that a difference between the travelling distances of light reaching the light receiving portions 4a and 4c after emitted from the light emitting element 3 and reflected on the reflector 5 and the travelling distance of light reaching the light receiving portion 4b after emitted from the light emitting element 3 and reflected on the reflector 5 becomes larger, and a position detection accuracy is lowered.

SUMMARY

The presently disclosed embodiment was made in the light of the above-mentioned problems, and an object of the presently disclosed embodiment is to provide a position detecting device using a reflection type photosensor, which can detect a position of a moving target accurately even in the case of a position detecting device required to be configured to arrange the light receiving portions overlapped each other.

In order to achieve the above-mentioned object, the position detecting device using a reflection type photosensor according to the first aspect of the presently disclosed embodiment for detecting a position of a moving target is characterized by comprising a reflector which is provided with reflecting portions and non-reflecting portions arranged alternately in a moving direction of the moving target and is fitted to the moving target; a reflection type photosensor which is located opposite to the reflector and has a light emitting element and a light receiving element provided with a plurality of light receiving portions receiving light emitted from the light emitting element and reflected on the reflector, in which the both elements are apposed in a direction orthogonal to the moving direction; and an operation means for calculating a value indicating the position of the moving target using output signals from the light receiving portions, wherein the light receiving element at least comprises the first and second light receiving portions located at different positions in the moving direction of the moving target which receive light from the reflector and output signals having different phases, the second light receiving portion is divided into the first and second light receiving regions provided at an opposite side of the light emitting element and at a side near the light emitting element about the first light receiving portion, and the operation means calculates one signal using the output signals from the first and second light receiving regions, and by using the calculation result and the output signal from the first light receiving portion, calculates a value indicating the position of the moving target.

The position detecting device using a reflection type photosensor according to the second aspect of the presently disclosed embodiment is characterized in that in the first aspect of the presently disclosed embodiment, the operation means is configured to calculate a phase angle $\theta=\arctan (A/B)$, assuming that the output signal from the first light receiving portion is A and the one signal calculated using the output signals from the first and second light receiving regions is B, thereby detecting the position of the moving target using this phase angle $\theta$.

The position detecting device using a reflection type photosensor according to the third aspect of the presently disclosed embodiment is characterized in that in the first or second aspect of the presently disclosed embodiment, the operation means calculates a neutral potential of the output signals having different phases and outputted from the plurality of light receiving portions using voltages of the output signals and executes the calculations using the output signals based on the neutral potential.

According to the position detecting device of the presently disclosed embodiment, a long distance movement of 10 mm or more can be detected only by providing a reflector having reflecting portions and non-reflecting portions arranged alternately on a moving target. In addition, since no magnetic field generating member is necessary unlike conventional devices, there is an advantage that the device is free of an influence of interaction between the magnetic fields. Further, only changing the arrangement of the light receiving portions enables longer-distance and higher-accuracy position detection to be carried out as compared with the position detecting device proposed by the applicant of the instant application prior to the presently disclosed embodiment of the instant application.

Further, according to the position detecting device of the presently disclosed embodiment, even in the case where the reflector and the reflection type photosensor are not arranged in parallel with each other, there is an advantage that long-distance and high-accuracy position detection can be carried out and a range of applications to which the device is applicable can be increased.

DETAILED DESCRIPTION

The position detection device using a reflection type photosensor of the presently disclosed embodiment is configured such that in a reflector having reflecting portions and non-reflecting portions arranged thereon in a moving direction of a moving target, light emitted from a light emitting element 6 is reflected on the reflecting portions of the reflector and enters into each of a plurality of light receiving portions, and a moving distance of the moving target can be calculated by carrying out a predetermined calculation in an operation means 8. The embodiment of the presently disclosed embodiment is then explained below in detail.

Figure 1:
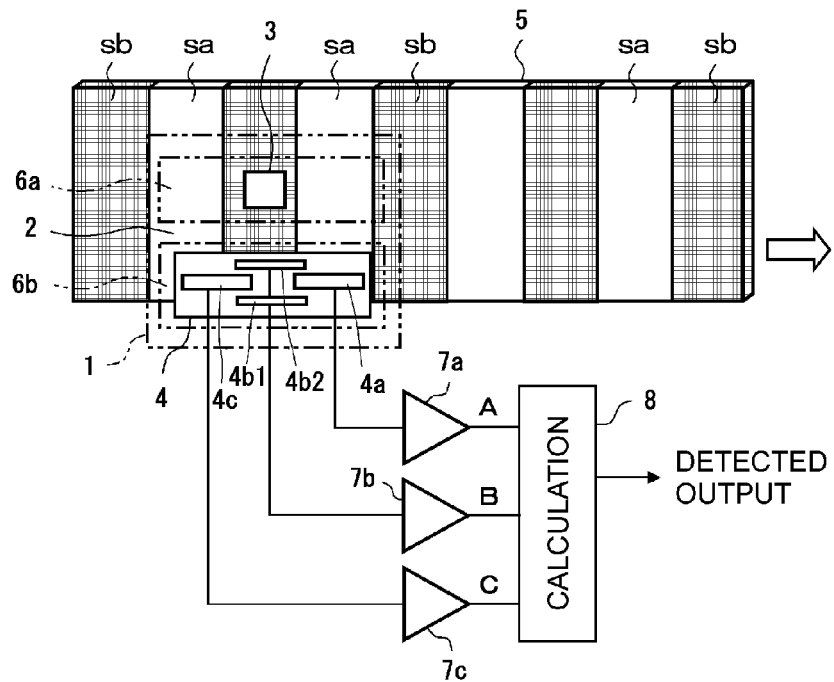
FIG. 1 shows a configuration of the position detecting device using a reflection type photosensor according to the presently disclosed embodiment.

FIG. 1 shows the position detecting device using a reflection type photosensor according to the embodiment of the presently disclosed embodiment. As shown in FIG. 1, in the reflection type photosensor 1, the light emitting element (LED) 3 is disposed on one concave portion 6a partitioned with an outer peripheral wall and a light-shielding wall 2 and the light receiving element (phototransistor) 4 is disposed on another concave portion 6b. On a light-emitting/light-receiving surface of this reflection type photosensor 1, the reflector 5 is arranged so as to move in a direction (a direction shown by an arrow) being parallel to the light-emitting/light-receiving surface and being approximately vertical to an arranging direction (longitudinal direction in the figure) of the light emitting element 3 and the light receiving element 4. This reflector 5 is fitted on a moving target such as a lens so as to move together with it, and by detecting a moving distance of the reflector 5, a moving distance of a moving target is detected.

On the reflector 5, reflecting portions "sa" and non-reflecting portions "sb" in the form of extra fine stripes are formed alternately (in the form of vertical stripes), and in this embodiment, the width of the reflecting portion "sa" and the width of the non-reflecting portion are approximately 300 µm each. The non-reflecting portions "sb" may be spaces in the form of slit. This reflector 5 can be formed easily and highly accurately by metal deposition or sputtering on a transparent glass using usual photolithographic technique for semiconductor and then removing metal films on the portions becoming the non-reflecting portions. Moreover, in the case of using a resin instead of a transparent glass as a substrate, it is possible to form the non-reflecting portions by partial surface roughening.

In the presently disclosed embodiment, the light receiving element 4 is provided with a plurality of light receiving portions at different positions in the direction of the moving target. One light receiving portion is divided into two light receiving regions at both sides of other light receiving portions; one is located at a side near the light emitting element 3 and another one is located at an opposite side of the light emitting element 3. These light receiving regions are arranged being partly overlapped with the other light receiving portions in the moving direction of the moving target.

In other words, the second light receiving region 4b2 is located at a side near the light emitting element 3 about the light receiving portion 4a and the first light receiving region 4b1 is located at an opposite side of the light emitting element 3 about the light receiving portion 4a. The first and the second light receiving regions 4b1 and 4b2 are arranged being partly overlapped with the light receiving portion 4a in the direction of the moving target. By this configuration, the first and the second light receiving regions 4b1 and 4b2 can be arranged being partly overlapped with the light receiving portion 4c.

By adjusting sizes and arrangement of the light receiving portion 4a, the light receiving portion 4c and the first and the second light receiving regions 4b1 and 4b2 and widths of the reflecting portions "sa" and the non-reflecting portions "sb" of the reflector 5, the three signals outputted from the photosensor 1 are designed, for example, such that the phase shifts forward 90 degrees (output B) to the reference signal (zero degree: output A) and 180 degrees (output C). In the presently disclosed embodiment, since the light receiving portions are arranged being overlapped as mentioned above, signals having a phase difference of 90 degrees and being excellent in linearity can be easily formed.

Figure 2:
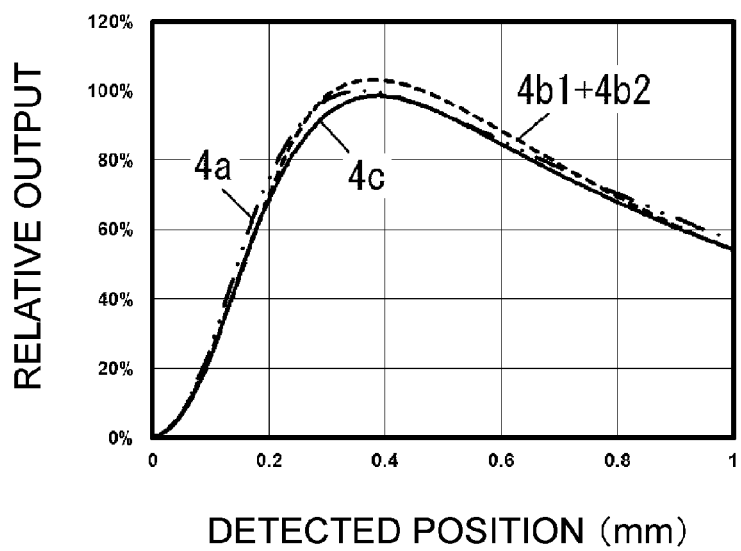
FIG. 2 is a graph for explaining output characteristic of the light receiving element used on the reflection type photosensor according to the presently disclosed embodiment.
Figure 10:
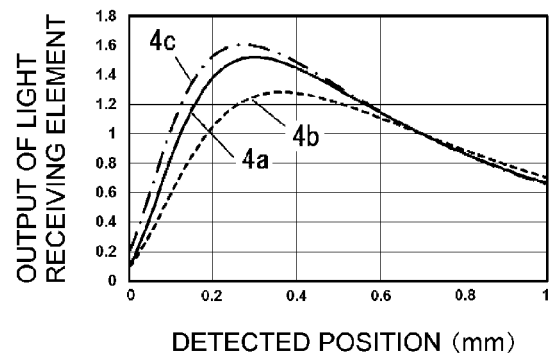
FIG. 10 is a graph for explaining output characteristic of the light receiving element of the position detecting device shown in FIG. 9.
Figure 11:
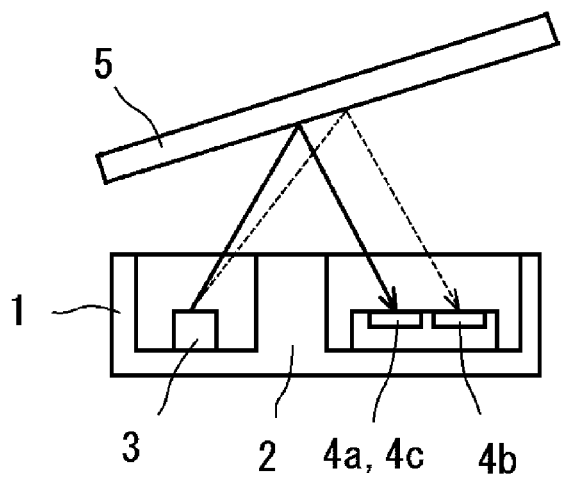
FIG. 11 is a view illustrating a position detecting device using a reflection type photosensor in which a reflector is fitted in an inclined form.

Relative outputs of the thus arranged light receiving portions are shown in FIG. 2. The outputs of the first and the second light receiving regions 4b1 and 4b2 are added and shown as "4b1+4b2". As shown in FIG. 2, the relative outputs obtained from each of the outputs are nearly the same, and as compared with the example of output characteristic of a conventional device shown in FIG. 10, it can be seen that an effect of the presently disclosed embodiment such that the relative outputs are nearly the same is large.

Among the output signals giving nearly the same relative outputs, the output from the light receiving portion 4a, the outputs from the first and the second light receiving regions 4b1 and 4b2 and the output from the light receiving portion 4c are outputted to buffer amplifiers 7a, 7b and 7c, respectively, and a moving distance is calculated in the operation means 8.

Figure 7A:
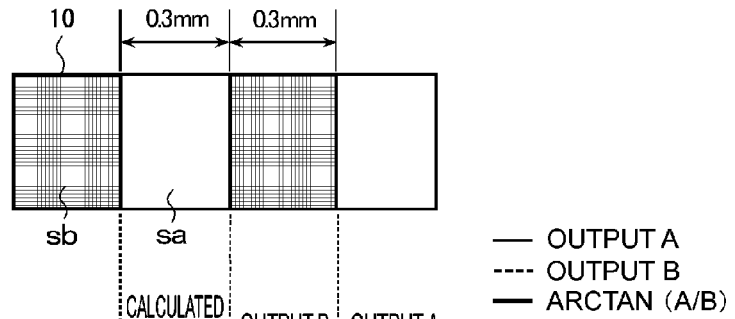
FIGS. 7A and 7B are a view and graph illustrating simulation data on calculation of a phase angle and a result of a calculation of linear values regarding a conventional position detecting device using a reflection type photosensor.
Figure 7B:
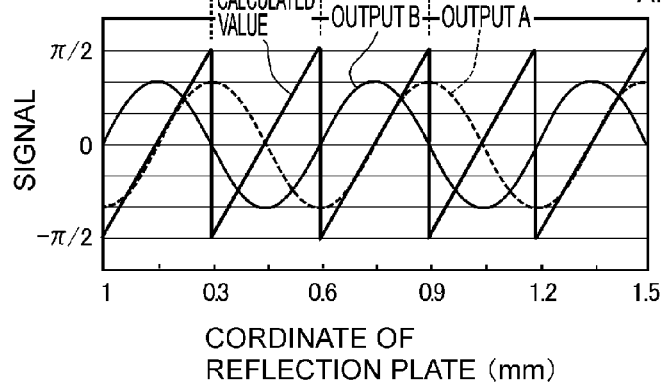
Figure 8:
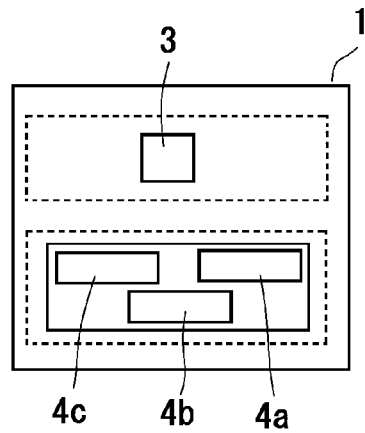
FIG. 8 is a view illustrating the conventional position detecting device using a reflection type photosensor proposed by the applicant of the instant application prior to the presently disclosed embodiment of the instant application.
Figure 9:
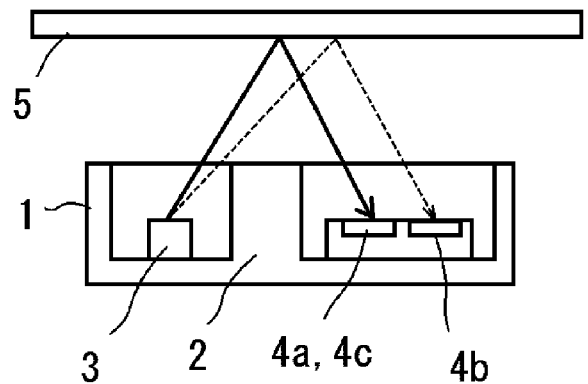
FIG. 9 is a cross-sectional view of the position detecting device using a reflection type photosensor shown in FIG. 8.

Specifically, an overlapping length and a distance between the light receiving portions are previously adjusted so that, for example, one cycle of the output signal waveform of the reflection type photosensor 1 can be obtained by the movement of 0.6 mm of the reflector 5 comprising the reflecting portion "sa" having a width of 0.3 mm and the non-reflecting portion "sb" having a width of 0.3 mm. Assuming the output of the light receiving portion 4a to be "A" and the sum of the outputs of the first and the second light receiving regions 4b1 and 4b2 to be "B", by calculating the phase angle θ of the signals by $\theta = \arctan(A/B)$ with the operation means 8, the operation result shown in FIG. 7B can be obtained and the position detection can be carried out.

In the presently disclosed embodiment, as shown in FIG. 2, the relative outputs outputted from each of the light receiving portions nearly coincide with each other, and therefore, triangular waveforms having an equal pitch are outputted and an accurate position detection can be carried out.

Figure 6:
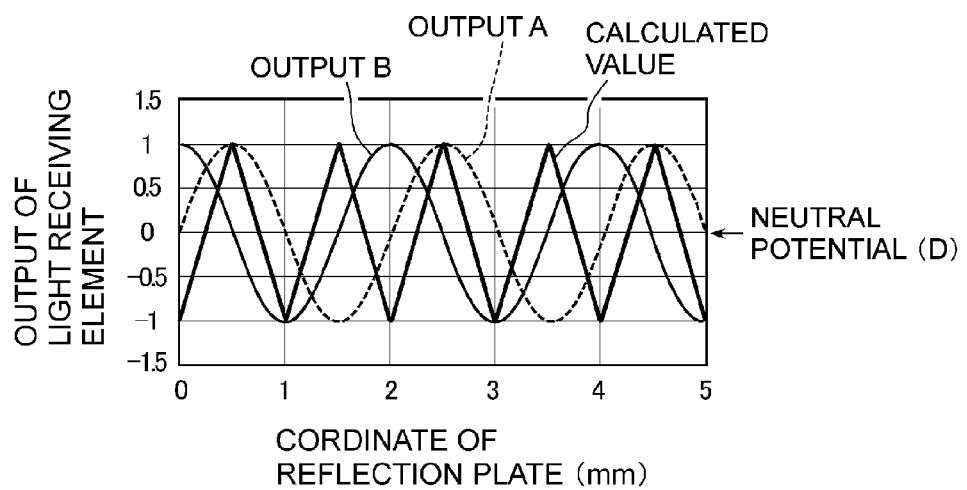
FIG. 6 is a graph showing simulation data and a result of a calculation of linear values regarding a conventional position detecting device using a reflection type photosensor.

The position detecting device of the presently disclosed embodiment also can carry out calculation shown in FIG. 6 using the operation means 8. Specifically, assuming the output of the light receiving portion 4a to be "A" and the sum of the outputs of the first and the second light receiving regions 4b1 and 4b2 to be "B", by carrying out calculations of (A−B)/(A+B) and (A+B)/(A−B) using the operation means 8, outputs of triangular waveforms repeating linear ascending lines and linear descending lines as the reflector 5 moves can be obtained. Further, repeated triangular waveforms having high linearity as shown in FIG. 6 can be obtained by calculating a neutral potential D by an equation D=(A+C)/2 based on the outputs from the light receiving portion 4a and the outputs from the light receiving portion 4c and setting a neutral potential of the outputs A and B to be always 0 V.

Also in this case, the relative outputs outputted from the respective light receiving portions nearly coincide with each other, and therefore, triangular waveforms are outputted at an equal pitch and accurate position detection can be carried out.

Figure 3:
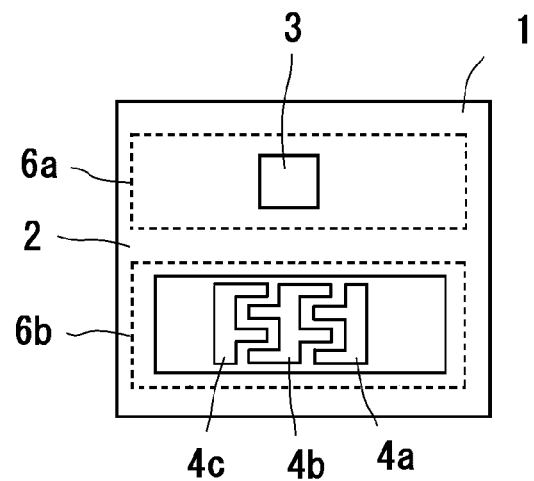
FIG. 3 shows another example of arrangement of the light receiving portions of the light receiving element used on the reflection type photosensor according to the presently disclosed embodiment.
Figure 4A:
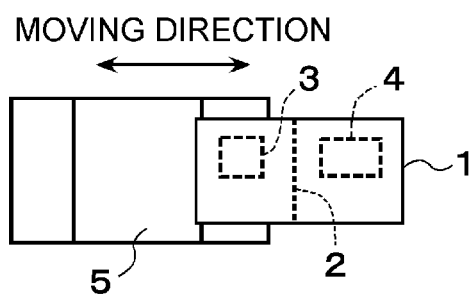
FIG. 4A shows a configuration of a conventional position detecting device.
Figure 4B:
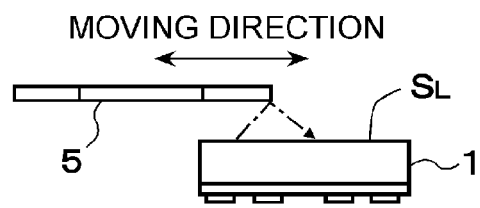
FIG. 4B shows a configuration of a conventional position detecting device.
Figure 5:
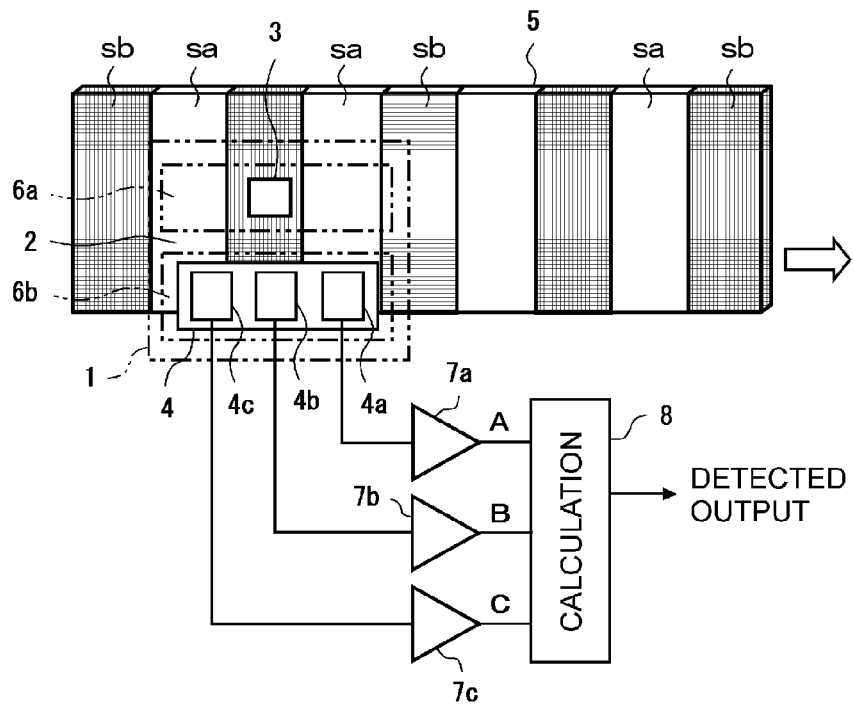
FIG. 5 is a view illustrating a configuration of a conventional position detecting device using a reflection type photosensor.

The arrangement of the light receiving portions of the presently disclosed embodiment is not limited to one shown in FIG. 1, and it is possible to employ a complicated structure in the hooked form as shown in FIG. 3.

While the configuration of providing the reflection type photosensor 1 in parallel with the reflector 5 is explained above, the presently disclosed embodiment enables the position detection to be carried out accurately even if the reflector 5 is arranged in a state of being inclined to the reflection type photosensor 1 since the outputs from the light receiving portions provided at positions of which distances from the light emitting element 3 are different from each other are operated as one output signal.

EXPLANATION OF SYMBOLS

1—Reflection type photosensor
2—Light shielding wall
3—Light emitting element
4—Light receiving element
5—Reflector
6a, 6b—Concave portion
7—Buffer amplifier
8—Operation means

What is claimed is:
1. A position detecting device using a reflection type photosensor for detecting a position of a moving target, comprising:
a reflector fitted to the moving target and provided with reflecting portions and non-reflecting portions arranged alternately in a moving direction of the moving target,
a reflection type photosensor located opposite to the reflector and having a light emitting element and a light receiving element provided with a plurality of light receiving portions receiving light emitted from the light emitting element and reflected on the reflector, in which the both elements are apposed in a direction orthogonal to the moving direction, and
an operation means for calculating a value indicating the position of the moving target using output signals from said light receiving portions,
wherein the light receiving element at least comprises the first and second light receiving portions located at different positions in the moving direction of the moving target which receive light from the reflector and output signals having different phases,
the second light receiving portion is divided into first and second light receiving regions provided at an opposite side of the light emitting element and at a side near the light emitting element about the first light receiving portion, and the operation means calculates one signal using the output signals from the first and second light receiving regions, and by using the calculation result and the output signal from the first light receiving portion, calculates a value indicating the position of the moving target.

2. The position detecting device using a reflection type photosensor of claim 1, wherein the operation means is configured to calculate a phase angle $\theta=\arctan(A/B)$, assuming that the output signal from the first light receiving portion is A and the one signal calculated using the output signals from the first and second light receiving regions is B, and to detect the position of the moving target by this phase angle $\theta$.

3. The position detecting device using a reflection type photosensor of claim 2, wherein the operation means calculates a neutral potential of the output signals having different phases and outputted from the plurality of light receiving portions using voltages of the output signals and executes the calculations using the output signals based on the neutral potential.

4. The position detecting device using a reflection type photosensor of claim 1, wherein the operation means calculates a neutral potential of the output signals having different phases and outputted from the plurality of light receiving portions using voltages of the output signals and executes the calculations using the output signals based on the neutral potential.

* * * * *